United States Patent [19]
Nelson et al.

[11] Patent Number: 6,037,947
[45] Date of Patent: Mar. 14, 2000

[54] GRAPHICS ACCELERATOR WITH SHIFT COUNT GENERATION FOR HANDLING POTENTIAL FIXED-POINT NUMERIC OVERFLOWS

[75] Inventors: Scott R. Nelson, Pleasanton; Wayne Morse, Fremont; Don Peterson, Elk Grove, all of Calif.

[73] Assignee: Sun Microsystems, Inc., Palo Alto, Calif.

[21] Appl. No.: 08/951,918

[22] Filed: Oct. 16, 1997

[51] Int. Cl.[7] .................................................. G06T 15/50
[52] U.S. Cl. .......................... 345/426; 708/552; 708/498; 345/523; 345/524; 345/525
[58] Field of Search .................................. 708/498, 552; 345/523–525, 426

[56] References Cited

U.S. PATENT DOCUMENTS

| | | | |
|---|---|---|---|
| 4,700,324 | 10/1987 | Doi et al. | 364/745 |
| 4,901,064 | 2/1990 | Deering . | |
| 5,517,611 | 5/1996 | Deering . | |
| 5,745,125 | 4/1998 | Deering et al. | 345/503 |
| 5,844,827 | 12/1998 | Wong | 364/715.08 |
| 5,856,831 | 1/1999 | Scott et al. | 345/503 |
| 5,926,406 | 7/1999 | Tucker et al. | 364/753 |

*Primary Examiner*—Mark K. Zimmerman
*Assistant Examiner*—Motilewa Good-Johnson
*Attorney, Agent, or Firm*—Conley, Rose & Tayon; Jeffrey C. Hood; Dean M. Munyon

[57] ABSTRACT

A 3-D graphics accelerator for performing lighting operations using operands within a given fixed point numeric range. The 3-D graphics accelerator includes a first computational unit which is configured to compute a value of an attenuation factor usable for performing said lighting operation for local lights. The attenuation factor is represented in floating point format. The first computational unit is also configured to represent the attenuation factor in an intermediate format including a first intermediate value (a scaled attenuation factor value within the given fixed point numeric range), and a second intermediate value (a shift count usable to convert the scaled attenuation factor value back to the original attenuation factor value). The 3-D graphics accelerator further includes a lighting unit coupled to said first computational unit. The first computational unit is further configured to convey the intermediate representation of the attenuation factor to the lighting unit. The lighting unit performs lighting calculations in fixed point, using operands within the given numeric range (such as the scaled attenuation factors). The lighting unit generates intermediate color values as a result of these lighting calculations. The lighting unit then uses the shift count value to shift the intermediate color values by an appropriate amount, thereby generating a final color value. The lighting unit clamps said final color value to a predetermined maximum color value in response to said final color value exceeding said predetermined maximum color value.

51 Claims, 7 Drawing Sheets

Computer

GRAPHICS ACCELERATOR WITH SHIFT COUNT GENERATION FOR HANDLING POTENTIAL FIXED-POINT NUMERIC OVERFLOWS

FIELD OF THE INVENTION

The present invention relates to a 3-D graphics accelerator, and more particularly to operations within the 3-D graphics accelerator which handle potential overflows for graphics operations performed using fixed-point numbers.

DESCRIPTION OF THE RELATED ART

A three-dimensional (3-D) graphics accelerator is a specialized graphics rendering subsystem for a computer system which is designed to off-load the 3-D rendering functions from the host processor, thus providing improved system performance. In a system with a 3-D graphics accelerator, an application program executing on the host processor of the computer system generates three-dimensional geometry data that defines three-dimensional graphics elements for output on a display device. The application program causes the host processor to transfer the geometry data to the graphics accelerator. The graphics accelerator receives the geometry data and renders the corresponding graphics elements on the display device.

The design architecture of a high performance three-dimensional graphics system historically embodies a balance between increasing system performance and minimizing system cost. However, prior graphics systems usually suffer from either limited performance or high cost due to a variety of system constraints.

Applications which display three-dimensional graphics require a tremendous amount of processing capabilities. For example, for a computer system to generate smooth 3-D motion video, the computer system is required to maintain a frame rate or update rate of between 20 to 30 frames per second. This requires a 3-D computer graphics accelerator capable of processing over a million triangles per second.

One architectural approach to increasing performance of 3-D graphics systems is through the use of algorithm specific circuits, dedicated to just one stage of a graphics pipeline. This trend started many years ago at the bottom end of the graphics pipeline with pixel processing functions, and gradually moved up to span interpolation, edge interpolation, and more recently, setup functions. Other functions performed earlier in the pipeline (such as transformation, clipping, and lighting) have generally been performed by more expensive general purpose floating-point processors, such as DSP chips or special microcoded floating-point hardware.

Increasingly, operations such as lighting are beginning to dominate computation time, particularly with the use of more complex lighting models. In order to achieve greater visual realism, users of graphics standards such as XGL and OpenGL routinely utilize multiple light sources. Each of these light sources may be classified as being either "infinite" or "local". The processing of local lights involves calculation of attenuation factors, which model the manner in which the intensity of the light decreases as the distance from the light source increases. Because of the range of values that these attenuation factors (and other parameters) may take on, floating point math is used for lighting calculations.

A major disadvantage of floating point arithmetic, however, is that the required hardware is relatively expensive in terms of size. This is problematic for lower-cost graphics systems seeking to maximize lighting performance, particularly in view of the fact the majority of lighting operations do not require the full range of floating point math.

It would therefore be desirable to have a graphics accelerator which exhibits increased lighting performance while providing the needed numeric range for calculations involving parameters such as attenuation factors.

SUMMARY OF THE INVENTION

The present invention comprises a 3-D graphics accelerator for performing lighting operations using operands within a given fixed point numeric range. The 3-D graphics accelerator includes a first computational unit which is configured to compute a value of an attenuation factor usable for performing the lighting operations for use with local lights. The attenuation factor is represented in a floating point format. The first computational unit is further configured to represent the attenuation factor in an intermediate format. This intermediate format includes a first intermediate value (a scaled attenuation factor value within the given fixed point numeric range), and a second intermediate value (a shift count usable to convert the scaled attenuation factor value back to the original attenuation factor value). In the preferred embodiment, the shift count is generated by subtracting a constant from an exponent portion of the attenuation factor value. The shift count is clamped to a maximum value if necessary.

The 3-D graphics accelerator further includes a lighting unit coupled to the first computational unit. The first computational unit is further configured to convey the intermediate representation of the attenuation factor to the lighting unit. The lighting unit performs lighting calculations in fixed point, using operands within the given numeric range (such as the scaled attenuation factors). The lighting unit generates intermediate color values as a result of these lighting calculations. The lighting unit subsequently uses the shift count value to shift the intermediate color values by an appropriate amount, thereby generating a final color value. The lighting unit clamps the final color value to a predetermined maximum color value in response to the final color value exceeding the predetermined maximum color value. The first computational unit and the lighting unit are configured to perform these calculations for a plurality of local light sources.

By calculating attenuation factors in floating point and then generating an intermediate representation for these values, the lighting unit can perform local light calculations in fixed point arithmetic. This allows the lighting hardware to be advantageously smaller (and thus less expensive). The fixed point lighting unit has the further advantage of being faster than a comparable floating point unit.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE EMBODIMENTS

Figure 1:
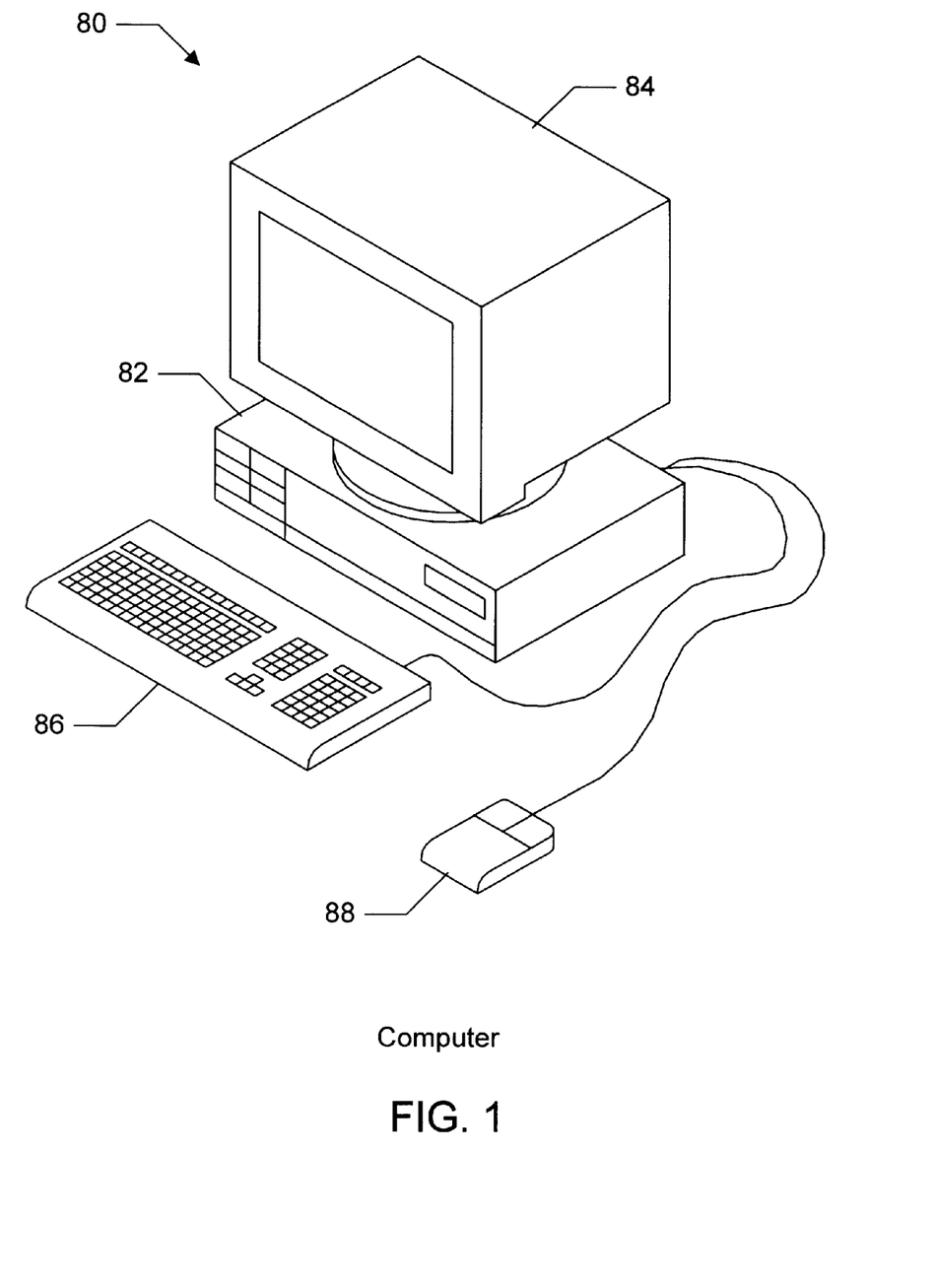
FIG. 1 illustrates a computer system which includes a three dimensional (3-D) graphics accelerator according to the present invention.

FIG. 1—Computer System

Referring now to FIG. 1, a computer system 80 which includes a three-dimensional (3-D) graphics accelerator according to the present invention is shown. As shown, the computer system 80 comprises a system unit 82 and a video monitor or display device 84 coupled to the system unit 82. The display device 84 may be any of various types of display monitors or devices. Various input devices may be connected to the computer system, including a keyboard 86 and/or a mouse 88, or other input. Application software may be executed by the computer system 80 to display 3-D graphical objects on the video monitor 84. As described further below, the 3-D graphics accelerator in computer system 80 includes a fixed point lighting unit which utilizes shift counts to handle potential numeric overflows resulting from calculations used to render three-dimensional graphical objects on display device 84.

Figure 2:
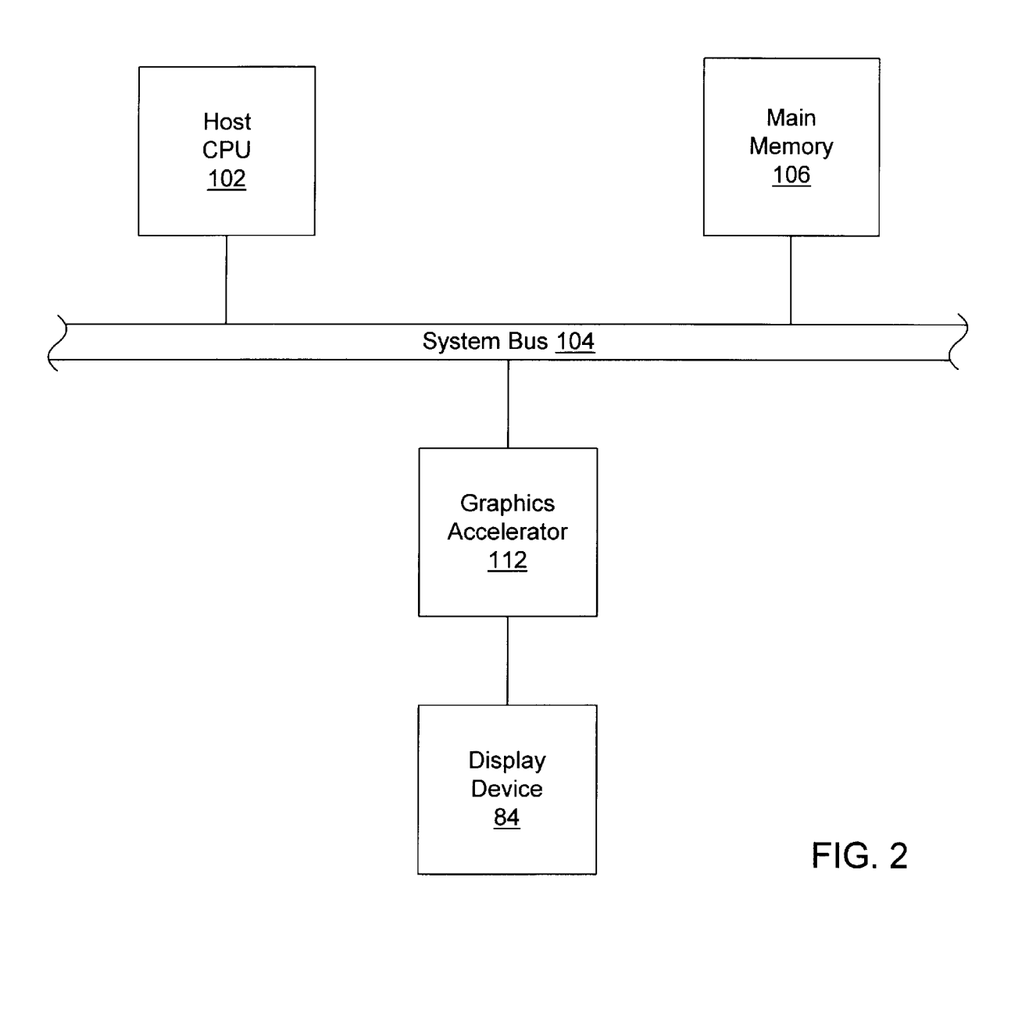
FIG. 2 is a simplified block diagram of the computer system of FIG. 1.

FIG. 2—Computer System Block Diagram

Referring now to FIG. 2, a simplified block diagram illustrating the computer system of FIG. 1 is shown. Elements of the computer system which are not necessary for an understanding of the present invention are not shown for convenience. As shown, the computer system 80 includes a central processing unit (CPU) 102 coupled to a high speed bus or system bus 104. A system memory 106 is also preferably coupled to the high speed bus 104.

The host processor 102 may be any of various types of computer processors, multi-processors and CPUs. The system memory 106 may be any of various types of memory subsystems, including random access memories and mass storage devices. The system bus or host bus 104 may be any of various types of communication or host computer buses for communication between host processors, CPUs, and memory subsystems, as well as specialized subsystems. In the preferred embodiment, the host bus 104 is the UPA bus, which is a 64 bit bus operating at 83 MHz.

A 3-D graphics accelerator 112 according to the present invention is coupled to the high speed memory bus 104. The 3-D graphics accelerator 112 may be coupled to the bus 104 by, for example, a cross bar switch or other bus connectivity logic. It is assumed that various other peripheral devices, or other buses, may be connected to the high speed memory bus 104, as is well known in the art. It is noted that the 3-D graphics accelerator may be coupled to any of various buses, as desired. As shown, the video monitor or display device 84 connects to the 3-D graphics accelerator 112.

The host processor 102 may transfer information to and from the graphics accelerator 112 according to a programmed input/output (I/O) protocol over the host bus 104. Alternately, the graphics accelerator 112 accesses the memory subsystem 106 according to a direct memory access (DMA) protocol or through intelligent bus mastering.

A graphics application program conforming to an application programmer interface (API) such as OpenGL generates commands and data that define a geometric primitive such as a polygon for output on display device 84. These primitives are modeled as being illuminated by light sources having attributes which are also defined by the application program. Host processor 102 transfers these commands and attribute data to memory subsystem 106. Thereafter, the host processor 102 operates to transfer the data to the graphics accelerator 112 over the host bus 104. Alternatively, the graphics accelerator 112 reads in geometry data arrays using DMA access cycles over the host bus 104. In another embodiment, the graphics accelerator 112 is coupled to the system memory 106 through a direct port, such as the Advanced Graphics Port (AGP) promulgated by Intel Corporation. Graphics accelerator 112 next performs lighting operations on the transferred primitives (after transformation), generating color values on a per-vertex basis in the preferred embodiment. Subsequent rendering operations are then performed upon the lighted primitives.

Figure 3:
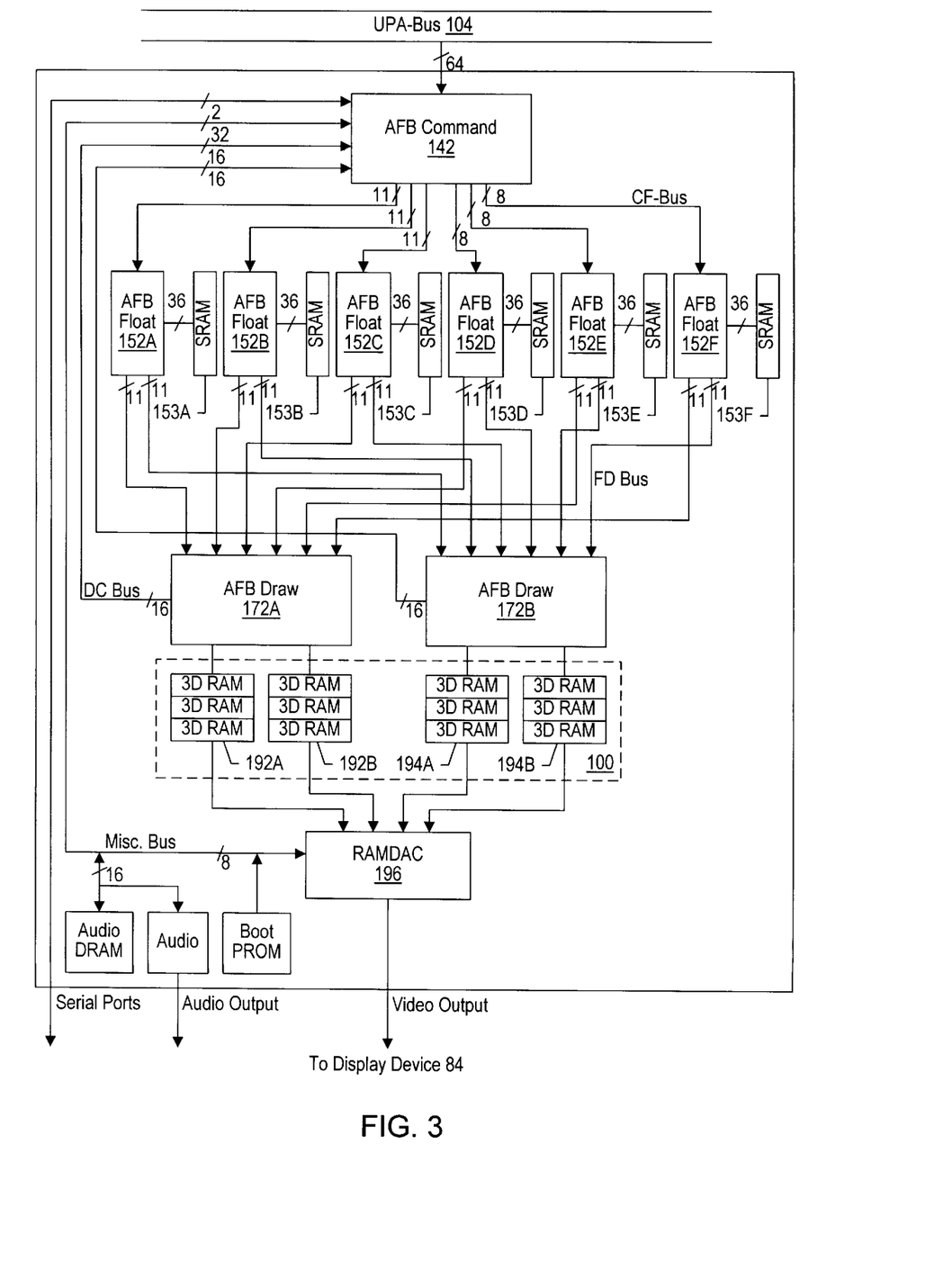
FIG. 3 is a block diagram illustrating the 3-D graphics accelerator according to the preferred embodiment of the present invention.

FIG. 3—Graphics Accelerator

Referring now to FIG. 3, a block diagram is shown illustrating the graphics accelerator 112 according to the preferred embodiment of the present invention. As shown, the graphics accelerator 112 is principally comprised of a command block 142, a set of floating-point processors 152A–152F, a set of draw processors 172A and 172B, a frame buffer 100 comprised of 3DRAM, and a random access memory/digital-to-analog converter (RAMDAC) 196.

As shown, the graphics accelerator 112 includes command block 142 which interfaces to the memory bus 104. The command block 142 interfaces the graphics accelerator 112 to the host bus 104 and controls the transfer of data between other blocks or chips in the graphics accelerator 112. The command block 142 also pre-processes triangle and vector data and performs geometry data decompression.

The command block 142 interfaces to a plurality of floating point blocks 152. The graphics accelerator 112 preferably includes up to six floating point processors labeled 152A–152F, as shown. The floating point processors 152A–152F receive high level drawing commands and generate graphics primitives, such as triangles, lines, etc. for rendering three-dimensional objects on the screen. The floating point processors 152A–152F perform transformation, clipping, face determination, lighting and set-up operations on received geometry data. Each of the floating point processors 152A–152F connects to a respective memory 153A–153F. The memories 153A–153F are preferably 32k ×36-bit SRAM and are used for microcode and data storage.

Each of the floating point blocks 152A–F connects to each of two draw processors 172A and 172B. The graphics accelerator 112 preferably includes two draw processors 172A and 172B, although a greater or lesser number may be used. The draw processors 172A and 172B perform screen space rendering of the various graphics primitives and operate to sequence or fill the completed pixels into the 3DRAM array. The draw processors 172A and 172B also function as 3DRAM control chips for the frame buffer 100. The draw processors 172A and 172B concurrently render an image into the frame buffer 100 according to a draw packet received from one of the floating-point processors 152A–152F, or according to a direct port packet received from the command processor 142.

Each of the floating point blocks 152A–F preferably operates to broadcast the same data to the two drawing blocks 172A and 172B. In other words, the same data is always on both sets of data lines coming from each floating point block 152. Thus, when the floating point block 152A transfers data, the floating point block 152A transfers the same data over both parts of the FD-bus to the draw processors 172A and 172B.

Each of the respective drawing blocks 172A and 172B couple to frame buffer 100, wherein frame buffer 100 comprises four banks of 3DRAM memory 192A–B, and 194A–B. The draw processor 172A couples to the two 3DRAM banks 192A and 192B, and the draw processor 172B couples to the two 3DRAM banks 194A and 194B, respectively. Each bank comprises three 3DRAM chips, as shown. The 3DRAM memories or banks 192A–B and 194A–B collectively form the frame buffer 100, which is 1280×1024 by 96 bits deep. The frame buffer stores pixels corresponding to 3-D objects which are rendered by the draw processors 172A and 172B.

Each of the 3DRAM memories 192A–B and 194A–B couple to a RAMDAC (random access memory digital-to-analog converter) 196. The RAMDAC 196 comprises a programmable video timing generator and programmable pixel clock synthesizer, along with cross-bar functions, as well as traditional color look-up tables and triple video DAC circuits. The RAMDAC in turn couples to the video monitor 84.

The command block is preferably implemented as a single chip. Each of the floating point processors 152 are preferably implemented as separate chips. In the preferred embodiment, up to six floating point blocks or chips 152A–F may be included. Each of the drawing blocks or processors 172A and 172B also preferably comprise separate chips. For more information on different aspects of the graphics accelerator architecture of the preferred embodiment, please see related co-pending application Ser. No. 08/673,492 entitled "Three-Dimensional Graphics Accelerator With Direct Data Channels for Improved Performance", and related co-pending application Ser. No. 08/673,491 entitled "Three-Dimensional Graphics Accelerator Which Implements Multiple Logical Buses Using Common Data Lines for Improved Bus Communication", both filed on Jul. 1, 1996.

As described above, command block 142 interfaces with host bus 104 to receive graphics commands and data from host CPU 102. These commands and data (including triangle primitives and corresponding light parameter data) are passed in turn to floating point processors 152 for transformation, lighting, and setup calculations. The general operation of these floating point processors 152, which are advantageously configured for improved lighting performance, is described with reference to FIG. 4. The F-core and L-core blocks within floating point processors 152, which combine to provide this improved lighting capability, are described more specifically with reference to FIGS. 5 and 6, respectively. A method for performing lighting calculations within a fixed point range using parameters which exceed this range is described with reference to FIG. 7.

Figure 4:
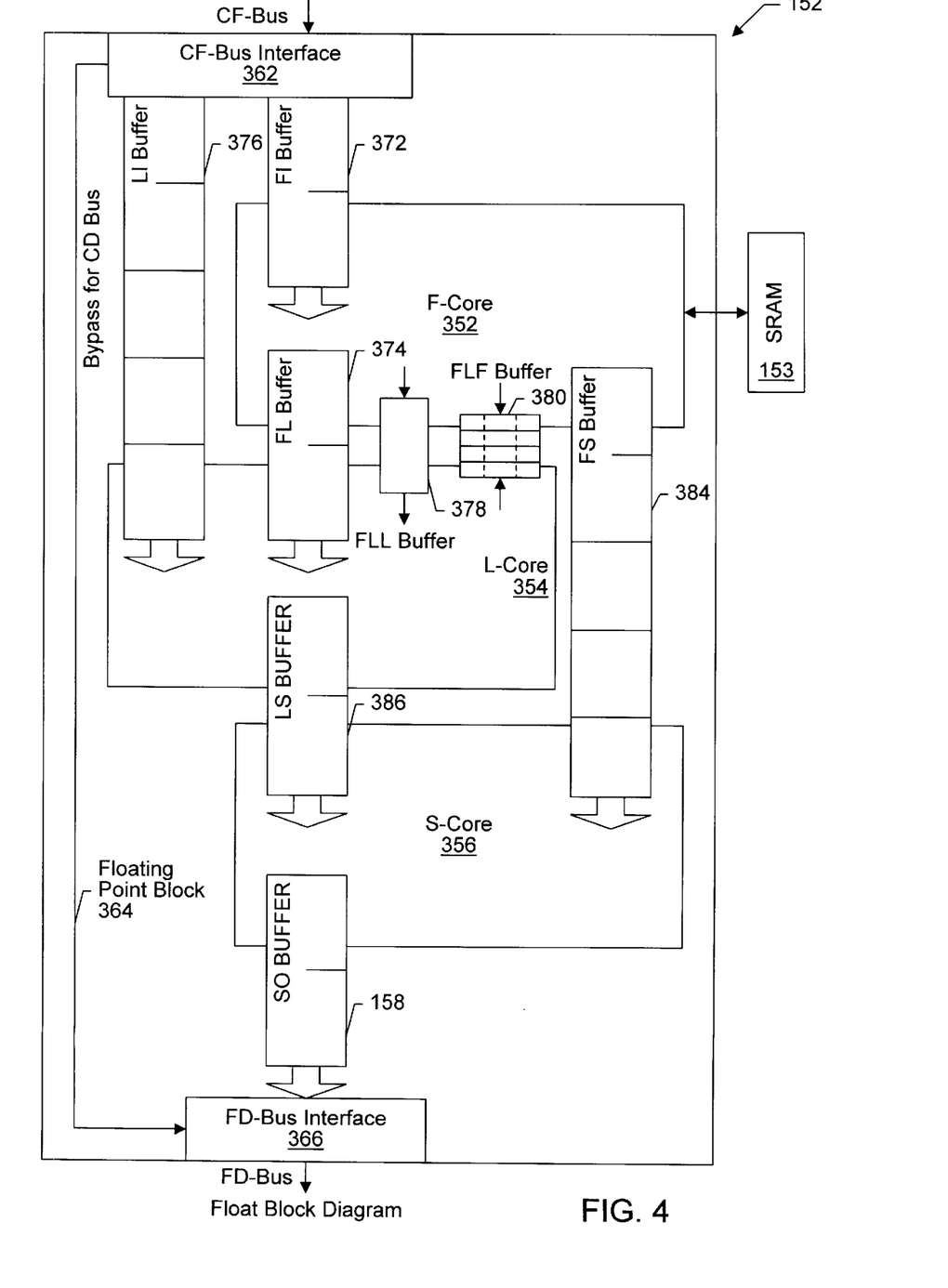
FIG. 4 is a block diagram illustrating one of the floating point processors in the 3-D graphics accelerator in the preferred embodiment of the present invention.

FIG. 4—Floating Point Processor Block Diagram

Referring now to FIG. 4, a block diagram illustrating one of the floating point processors 152 according to the preferred embodiment of the present invention is shown. Each of the respective floating point processors 152A–152F are identical, and thus only one is described here for convenience. As shown, each of the floating point blocks 152 includes three main functional units or core processors, these being F-core 352, L-core 354, and S-core 356. The F-core block 352 is coupled to receive data from the CF-bus transferred from the Command block 142. The F-core block 352 provides output data to each of the L-core block 354 and the S-core block 356. The L-core block 354 also provides data to the S-core block 356. The S-core block 356 provides output data to the FD bus.

The F-core block 352 performs all floating point intensive operations, including geometry transformation, clip testing, face determination, perspective division, and screen space conversion. The F-core block 352 also performs clipping when required. In the preferred embodiment, the F-core block 352 is fully programmable, using a 36-bit micro instruction word stored in a 32k word SRAM.

The L-core block 354 performs most lighting calculations using on-chip RAM-based microcode. Unlike prior art lighting units, L-core block 354 uses fixed point arithmetic to effect these calculations. In the preferred embodiment, the numeric range of L-core block 354 is −2.0 to +2.0, using a s1.14 format (one sign bit, one integer bit, and fourteen fractional bits). The majority of lighting calculations may be performed within this range using these type of 16-bit operands. Some parameters needed for lighting calculations, however, exceed this range, and are handled as described below.

The L-core block 354 also includes an efficient triple-word design for more efficient lighting calculations. This triple-word design operates with a 48-bit data word comprising 16-bit fixed point values. Thus one instruction can perform the same function on all three color components (RGB) or all three components of a normal ($N_x$, $N_y$, and $N_z$) in one cycle. The math units comprised in the L-core block 354 automatically clamp values to the allowed numeric range, thus requiring no additional branches.

The S-core block performs setup calculations for all primitives. These set-up calculations involve computing the distances in multiple dimensions from one vertex to another and calculating slopes along that edge. For triangles, the slopes of the Z depth, the color, and the UV (for texture) are also computed in the direction of a scan line.

As shown, each of the floating point blocks 152 includes CF-bus interface logic 362 which couples to the CF-bus. Each of the floating point blocks 152 includes FD-bus interface logic 366 which couples to the FD-bus. Each floating point block 152 includes a bypass bus or data path 364 which serves as the data transfer path through a respective floating point block 152 for the CD bus. Data which is sent over the CD bus, i.e., which is sent directly to the FD bus, travels on the data transfer bus 364, thus bypassing the floating point logic comprised in the floating point block 152.

In general, data which is provided to the floating point block 152 can have one of three destinations, these being the F-core block 352, the L-core block 354, or directly out to the FD bus, i.e., a CD bus transfer. In the preferred embodiment, data which is destined for the F-core block 352 comprises 32-bit words, including 32-bit IEEE floating point numbers and other 32-bit data. Data destined for the L-core block 354 comprises 48-bit words comprising three 16-bit fixed point numbers.

As shown, the floating point block 152 includes a float input buffer (FI buffer) 372 which receives data from the CF-bus which was provided by the command block 142. The FI buffer 372 is double-buffered and holds 32 32-bit entries in each buffer. The first word, word zero, stored in the FI buffer 372 comprises an opcode which informs the F-core block 352 which microcode routine to dispatch for the received geometric primitives. Only the header and X, Y and Z coordinates are provided to this buffer when transforming and lighting geometric primitives.

The floating point block 152 also includes an F-core to L-core buffer (FL buffer) 374. The FL buffer 374 is double buffered and holds 16 16-bit entries in each buffer. The F-core block 352 operates to write or combine three F-core words into one L-core word which is provided to the FL buffer 374. From the L-core perspective, each buffer in the FL buffer 374 appears as five 48-bit entries. During lighting operations, three X, Y, Z coordinates are sent from the F-core block 352 through the FL buffer 374 to the L-core block 354. These three X, Y, Z coordinates are used to compute eye direction.

The floating point block 152 includes an L-core input buffer (LI buffer) 376 which receives data sent across the CF-bus which was provided from the command block 142 and provides this data to the L-core block 354. The LI buffer 376 comprises five buffers, each of which hold seven 48-bit entries. These seven 48-bit entries comprise three vertex normals, three vertex colors and one word with three alpha values. The FI buffer 372 and the LI buffer 376 collectively comprise the floating point block input buffer.

The floating point block 152 also includes an FLL buffer 378, which connects between the F-core block 352 and the L-core block 354. The FLL buffer 378 is a FIFO used for transmitting lighting and attenuation factors from the F-core block 352 to the L-core block 354. These attenuation factors comprise three X,Y,Z position values, three attenuation values, three ambient light values, and one attenuation shift word containing three packed values. An FLF buffer 380 is also provided between the F-core block 352 and the L-core block 354. The FLF buffer is a bi-directional buffer used for communicating data between the F-core block 352 and the L-core block 354 under F-core control.

An L-core to S-core buffer (LS buffer) 386 is coupled between the L-core block 354 and the S-core block 356. The LS buffer 386 is double-buffered with each buffer holding four 48-bit words.

The floating point block 152 also includes an F-core to S-core buffer (FS buffer) 384 which is used for transferring data from the F-core block 352 to the S-core block 356. The FS buffer comprises five buffers which each hold 32 32-bit values. These five buffers are designed to match the pipeline stages of the L-core block 354, these being the two FL buffers, the two LS buffers, plus one primitive which may be stored in the L-core block 354. Data transferred from the F-core block 352 through this buffer to the S-core block 356 includes a dispatch code that indicates which microcode procedure to run in the S-core block 356.

Finally, the floating point block 152 includes an S-core output buffer (SO buffer) 158 which is coupled between the S-core block 356 and the FD bus interface 366. The SO buffer 158 collects data to be sent across the FD bus to the respective draw processors 172A–172B. The SO buffer 158 is double buffered and holds 32 32-bit words in each buffer. The SO buffer 158 holds up to two primitives comprising fixed point data in the order needed by the respective draw processors 172A–172B. S-core block 356 conveys additional status information along with the fixed point data to draw processors 172. For example, a status bit is conveyed with each entry indicating whether or not a given primitive is the last of a group of related primitives. The SO buffer 158 includes a separate status register which indicates how many words are valid so that the minimum number of cycles are used to transfer the data across the bus. The SO buffer 158 comprises the floating point block output buffer 158.

Figure 5:
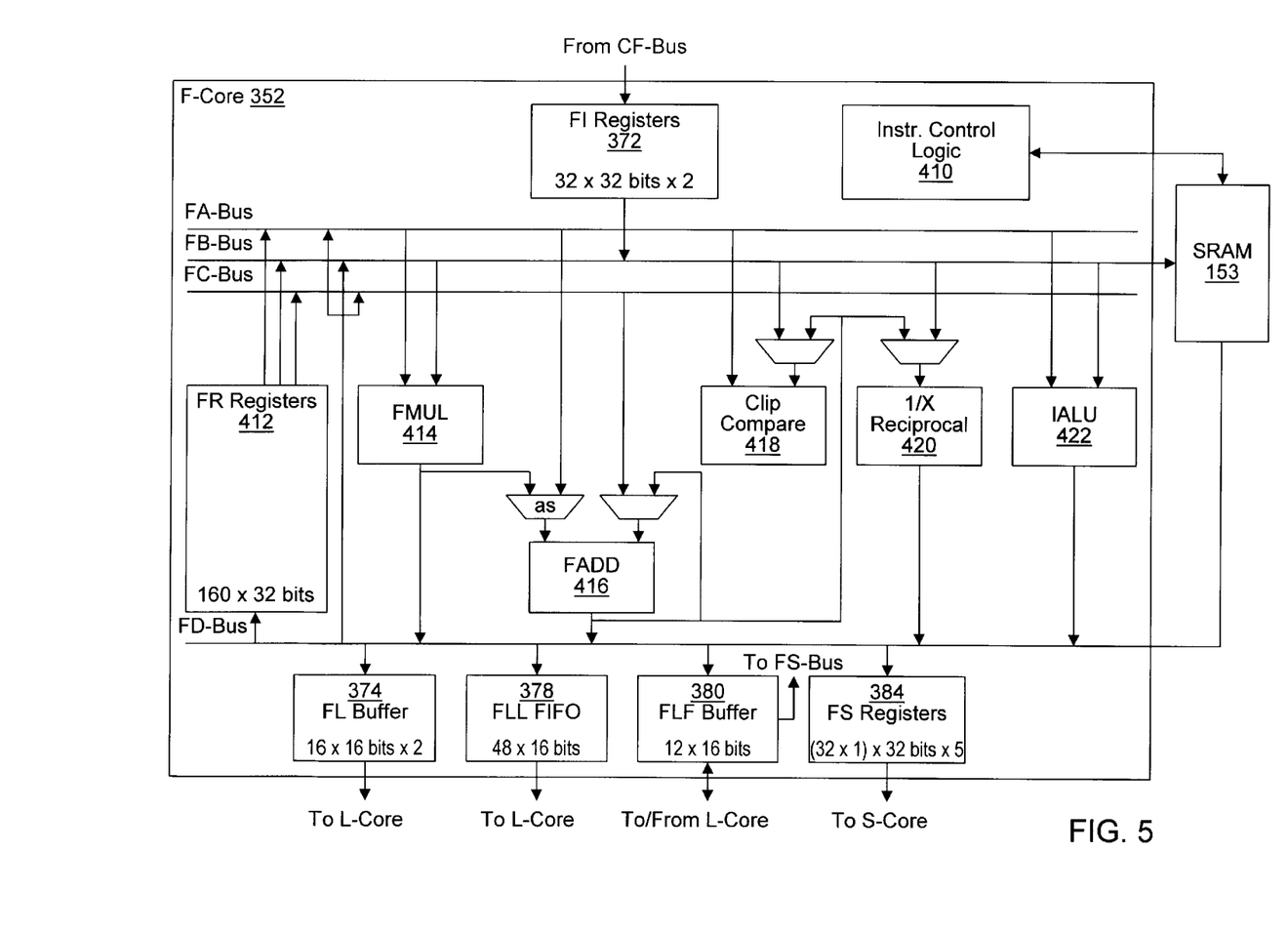
FIG. 5 is a block diagram illustrating the F-Core block of the floating point processors in the preferred embodiment of the invention.

FIG. 5—F-Core Block Diagram

Referring now to FIG. 5, a block diagram illustrating the F-Core block 352 in each of the floating point processors 152 is shown. F-core processor 352 receives geometry primitive data and performs floating point operations on the received geometry data. The F-core processor 352 performs operations such as transforming vertex positions from model space to view space, performing clipping operations on received geometry data, performing perspective division to convert received vertex information to screen space, and determining if a triangle is front-facing or back-facing. The F-core processor also performs some lighting operations, as will be described further below.

As shown, the F-core processor 352 includes FR registers 412 which store constants and intermediate values. The FR register file 412 preferably includes 160 registers and also includes three read ports and one write port. The FR register file 412 couples to three buses referred to as the FA-bus, the FB-bus and the FC-bus. The F-core processor 352 includes three buses to allow multiply accumulate operations to occur once per clock cycle.

The F-core processor 352 includes a floating point multiplier (FMUL) 414, a floating point adder (FADD) 416, a clip compare unit 418, a reciprocal unit 420, and an integer arithmetic-logic unit (IALU) 422. Each of these math units are coupled to one or more of the FA, FB, and FC buses.

The floating point multiplier (FMUL) 414 receives inputs from the FA and FB buses and outputs either directly to the FD-bus or to a floating point adder (FADD) 416. The floating point adder 416 receives two inputs. One side of the floating point adder 416 receives its input from either the FC-Bus or from the floating-point multiplier 414. The other input of the adder 416 is coupled to receive data from either the FC-Bus or from the output of the adder 416. Thus the output of the adder 416 is fed back into one of its inputs. This loop back or feedback feature allows values to be accumulated from several multiples without having to pass back through the FR registers 412. The adder 416 is thus designed to feed a value back through after four cycles, which exactly matches the matrix multiple operation used to transform vertices.

The inclusion of dedicated clip compare circuitry in clip compare unit 418 obviates the necessity of the floating point adder 416 having to perform this function. The inclusion of dedicated clip compare circuitry also saves the extra cycles that would have been needed to perform clip testing. The clip testing unit 418 performs comparisons for both regular and guard band clipping planes concurrently. The clip testing unit 418 thus advantageously allows four comparisons (positive and negative regular clipping planes and positive and negative guard band clipping planes) in one instruction cycle.

The reciprocal unit 420 receives its input from either the FB-Bus or the result of the floating-point add unit 416. Math units other than the reciprocal unit 420 require a fixed number of cycles to produce a result, and then the result is put onto the FD-Bus. The reciprocal unit 420 holds its result until an instruction is issued to read the reciprocal result.

The integer arithmetic-logic unit (IALU) 422 performs addition, subtraction, boolean operations, bit test/set/clear/ operations, and barrel shifts. It also performs an inverse square root function.

The F-core processor 352 also includes instruction control logic 410, which interfaces to microcode and data stored in SRAM array 153. Instruction control logic 410 effectuates operation of commands specified by command block 142 via microcoded commands stored in SRAM 153. Although not explicitly shown in FIG. 6, instruction control logic 410 interfaces to multiplier 414, adder 416, clip testing 418, etc., to sequence the flow of instructions.

F-Core Communication Buffers

As discussed above, the F-core processor 352 includes five different buffers that are used for inter-chip communication. The FI registers 372 are input only and contain data received from the command block 142 across the CF-Bus. The FI registers 372 appear as 32 entries in the overall register address space. Data appears in the FI registers after executing a "need_FI" instruction, which halts instruction sequencing if a complete primitive is not available in the input buffer. For primitives which are smaller than 32 words (i.e. most primitives), not all 32 entries are valid. When a "free_FI" instruction is executed, the buffer is immediately able to receive more data. This buffer is double-buffered so that under normal circumstances data may be read into one buffer while data in the other buffer is being used. Then, when "free_FI" and "need_FI" are executed, the next buffer full of data will be available.

The FL buffer 374 is normally used to send an XYZ direction vector to L-Core 354 for each vertex. When triangles are clipped, the FL buffer 374 is used to send the clipped RGB color values as well as the clipped alpha value. All values stored into the FL buffer 374 are 32-bit fixed-point, but only 16 bits are kept in the buffer, aligned to match the 16-bit fixed-point format of the L-Core block 354. When L-core 354 removes data from the other side of the FL buffer 374, the L-core block 354 pulls each set of three words out as one 48-bit word. Like the FI buffer 372, the FL buffer 374 is also double buffered and controlled by "need" and "free" instructions.

The FLL FIFO 378 is used for passing the attenuation factors for local light sources (both point and spot lights). Because the FLL FIFO 378 is a FIFO, the FLL FIFO 378 passes data using reads and writes rather than by directly using "need" and "free" instructions. The FLL FIFO 378 also appears as only one single register to both F-Core 352 and L-Core 354. It should be noted that when F-Core 352 issues a "need FLL" instruction, there must be at least three empty locations in the FLL buffer 378 before it is available. The use of FLL FIFO is described in further detail with reference to FIG. 7.

The FLF Buffer 380 is used for transferring data both directions between F-Core 352 and L-Core 354. Values are written to specific addresses in the buffer 380 and read on the other side from corresponding addresses. Synchronization is achieved using two flag registers, one for passing data from F-Core 352 to L-core 354 and the other for the opposite direction. Microcode guarantees that the FLF buffer 380 is only used in one direction at a time.

The color and alpha values computed during the lighting calculations are stored in the FLF buffer 380 as well as the LS buffer 386 when lighting is completed. If F-Core 352 sets the clip-pending mode, the values in the FLF buffer 380 are read back by F-Core 352 and the values in the LS buffer 386 are ignored. In the normal case where no clipping occurs, the FLF buffer 378 is ignored and the LS buffer values are sent on to S-Core 356.

When F-Core 352 needs to "borrow" the L-Core functions unit for spot light exponent computations, the three values are sent using the FLF buffer 378. Later, the three result values are sent back in the FLF buffer 378. In both cases, only the least significant 16 bits of the 48-bit word are used for transferring data.

The FS registers 384 are output-only and are used to send data to S-Core for setup computations. All data to be processed by S-Core 356 is in one of the two fixed-point formats: s1.30 or s11.20. One primitive may have up to 32 words of data in the FS registers 384 plus one word containing header information, consisting of an op-code and several control bits. Rather than being double-buffered like many of the other buffers, there are five buffers in the FS registers 384 to account for the two FL buffers 374, the two LS buffers 386 (out of L-Core), plus one primitive that is being processed in L-Core 354. The FS registers 384 are switched using "need" and "free" instructions.

Figure 6:
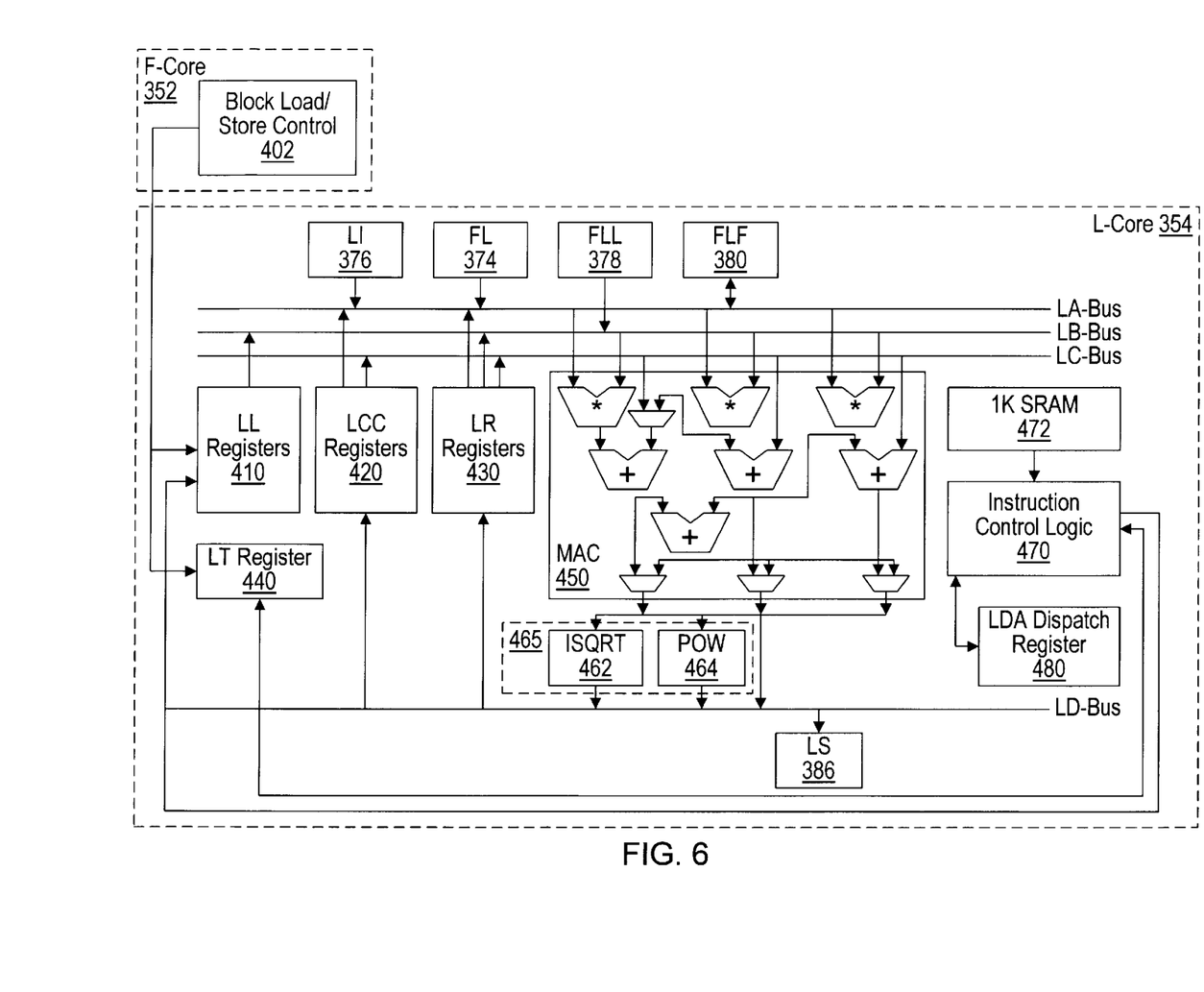
FIG. 6 is a block diagram illustrating the L-core block of the floating point processors in the preferred embodiment of the present invention.

FIG. 6 L-Core Block Diagram

Referring now to FIG. 6, a block diagram illustrating the L-Core block 354 in each of the floating point processors 152 is shown. The L-core block 354 comprises a fixed point computational unit for performing lighting computations. As depicted, L-core block 354 receives data from LI buffer 376, FL buffer 374, FLL buffer 378, and bi-directional FLF buffer 380. Information is stored within L-core block 354 in LL (light) register file 410, LCC (color) register file 420, and LR (general purpose) register file 430. Operands are conveyed from register files 410, 420, and 430 to an LA-bus, an LB-bus, and an LC-bus to a multiply-accumulate block 450 for lighting computations. These computations are performed under control of instruction control logic block 470, executing microcode stored in an SRAM 472. Additional lighting computations are performed in an inverse square root (ISQRT) block 462 and a power function unit 464, which are part of special function block 365. Lighting results are conveyed on an LD-bus, and conveyed to S-core block 356 via LS buffer 386.

The L-core processor 354 is designed specifically to perform lighting calculations. In the preferred embodiment, the L-core block 354 performs the majority of the lighting operations (specifically, those for which the operands are within the −2.0 to +2.0 fixed point range). The F-core block 352 performs lighting computations for more complex light sources which require the use of a general purpose floating point processor, such as point and spot light sources. This process is described more fully with respect to FIG. 7.

In the preferred embodiment, all calculations in L-core block 354 are performed using 16-bit fixed-point math, three at a time. The three values in a 48-bit word may either represent one triple such as XYZ, normal, or RGB, or may represent a value (e.g., an alpha value) for each three different vertices of a triangle. The lighting computation performed by L-core 354 does not use pre-multiplied material color with other lighting attribute's cached values. This allows the graphics accelerator to support RGB per-vertex color triangle meshes as a high quality alternative to texture and bump mapping. In general, most lighting operations are expected to include a per-vertex color change. While this requires some increased computation in the L-Core block 354, it is completely overlapped by other units (i.e., L-Core is still faster than both F-Core and S-Core). This change also makes it much easier to support OpenGL's semantics, in which colors might change at any vertex without warning and without any effective way of caching.

The L-Core 354 has efficient 16-bit function units and also performs the model space to world space transformation on vertex normals. The command block 142 delivers normal data to the floating point processor 152 as 48-bit values (3 16-bit components), already normalized. The L-Core registers include two 3×3 normal transformation matrices, stored as three 48-bit values each. The two transformation matrices are used to perform left and right eye transformations in stereo mode.

Colors and normals are transferred from the command block 142 to L-Core 354 by way of the LI-Buffer 376. The lighting calculations are performed in response to microcode instructions residing in SRAM 472 and executing under control of instruction control logic 470 and a dispatch word passed in from F-core block 352. The L-Core instruction set does not include conditional branch instructions, so each step of the lighting calculation runs to completion, then the next step is started based on the contents of the next dispatch word.

The L-Core 354 includes three different register files in addition to the input and output buffers. The LL registers 410 contain the values for each of up to 32 lights. LT register 440 specifies which light to access, since only one light may be accessed at a time. The light values are loaded by F-Core 352 and are not modified by L-Core 354. The LR registers 430 are used as general purpose registers for storing intermediate values from the lighting computations. The LCC registers 420 hold the material properties or "current color" values for primitive vertices.

L-Core block 354 includes multiply-accumulate block 450, including one unit for each of the three 16-bit values in the 48-bit word. Standard operation of each of the multiply-accumulate units is 48 bits in and 48 bits out. For the dot product calculation, there is only a 16-bit result, so this result is replicated into each of the three 16-bit fields.

Inverse square root (ISQRT) block 462 is used in normalizing the viewpoint vector. The ISQRT block 462 receives 16 bits from a dot product calculation and produces a 16-bit result, replicated to three values in the 48-bit word. Furthermore, the L-Core 354 also includes a power function unit 464 which is used for computing specular highlights. The power function unit 464 also takes in 16 bits from a dot product calculation and produces a 16-bit result, replicated to three values in the 48-bit word. The power function unit 464 performs two table lookups and performs other calculations to produce an accurate value. The result is accurate to 0.5%, or accurate to a least significant bit of an 8-bit color.

L-Core Communication Buffers

The L-Core 354 includes five different buffers for communicating with other parts of the chip. The LI Buffer 376 corresponds to the FI buffer 372 in F-Core block 352. The LI Buffer 376 is used for accessing incoming data from command block 142 coming across the CF-Bus. The LI Buffer 376 appears as seven 48-bit registers and contains three colors, three normals, and one word containing the three alpha values. Like the FS registers 384 in F-Core 352, the LI buffer 376 comprises five buffers to match up with the two FI Buffers 372, the two FL buffers 374, plus the one primitive that is being processed in F-Core 352.

The FL Buffer 374 is used to receive the XYZ viewpoint vector from F-Core 352. The FL Buffer 374 is also used to store clipped RGB color and alpha values when necessary. The FLL FIFO 378 is used for passing attenuation values for local lights. These values require floating-point computations that may only be performed in F-Core 352. When the lighting calculations get to the point where the attenuation factor is needed for a light, L-Core 354 pauses until the data is available in the FLL FIFO 378.

The FLF Buffer 380 is for communication between L-Core and F-Core and is not intended for normal operation. One run-time use of the FLF buffer 380 is to send lighting values back to L-Core 354 during clipping and for F-Core to "borrow" the power function logic from L-Core 354 for use with spot lights. To do this, F-Core writes the two power function parameters to the FLF buffer 380, then interrupts L-core and requests that the computation be performed. When computations are complete, the result is placed back into the FLF buffer 380 and L-Core 354 is allowed to continue. F-Core 352 then reads the result out of its side of the FLF buffer 380. The FLF buffer 380 is also used for diagnostic purposes.

The LS Buffer 386 comprises the write-only output registers used to send data to S-Core 356 for setup computations. Only colors and alpha values are sent across this interface. For standard triangles, three colors and one alpha word (containing three values) are sent to S-Core 356. In the preferred embodiment, the LS Buffer 386 comprises four double-buffered entries.

Attenuation Factor Calculations

To more accurately represent lighting effects, current graphics standards support attributing attenuation factors to light sources which illuminate one or more graphical objects. These attenuation factors model the decrease in light intensity as the distance between a light source and an object increases. Typically, an attenuation factor for a given light source is multiplied by a color value for a primitive vertex, producing an intermediate color value. The cumulative effect of all light sources (with corresponding attenuation factors) are considered in generating the final color value for a vertex. Attenuation factors are only used for calculations involving local (as opposed to infinite) light sources.

In the preferred embodiment of the present invention, an attenuation factor $f_{att}$ is modeled by the equation $$f_{att} = \frac{1}{(k_c + k_l \cdot d + k_q \cdot d^2)},$$

where $k_c$, $k_l$, and $k_q$ are attenuation constants, and d is distance to the light source. The user may specify any combination of the three attenuation constants for calculation of $f_{att}$. For one light source, for example, only $k_c$ may be specified.

Typically the denominator of the attenuation factor equation increases as the distance from the light source increases. This causes the quantity $f_{att}$ to approach zero. Correspondingly, the result of the multiplication of $f_{att}$ with a color value is likely to be within the numeric range of L-core block 354. In the preferred embodiment, the color value is limited to being between 0 and 1 (since this is the format used by frame buffer 100). However, consider a case in which only constant $k_c$ is specified. Since there is no limitation on the value of $k_c$, if this quantity is less than one, the result of the multiplication offatt with a vertex color value may overflow the predetermined range for color values. Another case in which this overflow may happen is if the linear and quadratic attenuation constants ($k_l$ and $k_q$) are being used and the distance is less than one. In both cases, an overflow leads to the result of the multiply being clamped to 1.0, which gives an "over-exposed" appearance for the given vertex, which looks natural.

In the preferred embodiment of the present invention, F-core block 352 performs calculation of attenuation factors. As will be described below, these attenuation factors are then passed to L-core block 354 in an intermediate format. This intermediate format allows lighting calculations involving attenuation factors to be performed within the numeric range of L-core block 354. A shift operation is then performed if necessary to convert the result of the lighting operation back to the appropriate range. Any values which overflow are clamped to 1.0.

Figure 7:
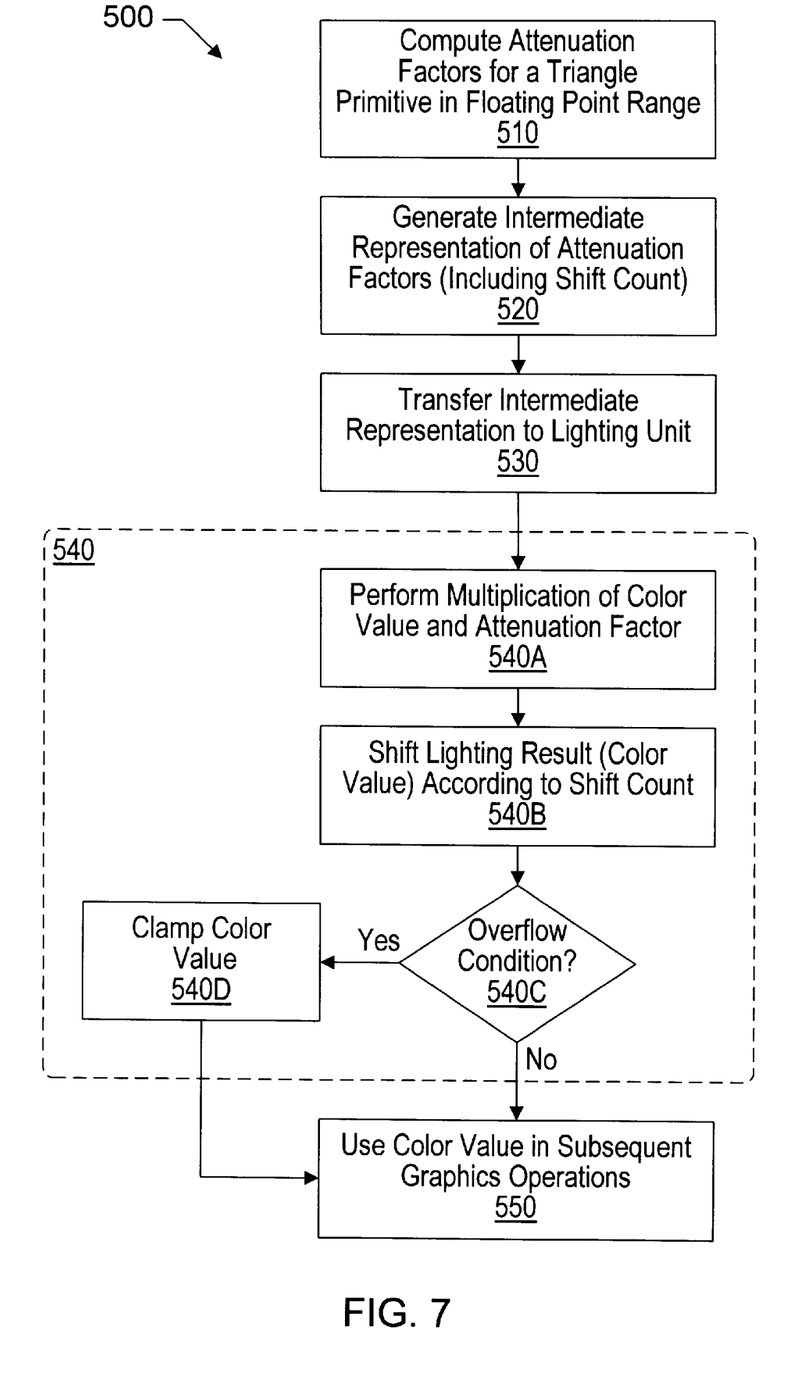
FIG. 7 is a flowchart depicting a method of performing lighting calculations involving attenuation factors according to one embodiment of the present invention.

FIG. 7—Handling of Potential Numeric Overflows Using Shift Counts

Referring now to FIG. 7, a method 500 is depicted for performing lighting operations involving parameters which may cause potential numeric overflows. While method 500 is discussed with reference to performing lighting calculations involving attenuation factors, method 500 is also applicable to graphics operations to be performed in fixed point format involving other types of attributes.

In step 510, F-core block 352 calculates attenuation factors for a given light source and a given triangle primitive (one per vertex, since the distance from the light source typically differs for each vertex of the primitive). These calculations are performed in the various arithmetic blocks of F-core 352 (multiply unit 414, add unit 416, etc.) according to local light routines stored in SRAM 153 and under the control of instruction logic block 410. One equation for calculating attenuation factors is described above. In an alternate embodiment, F-core block 352 may be configured to calculate the attenuation factors differently by changing the local light routines stored in SRAM 153.

As part of the local light routines which calculate the attenuation factors, F-core block 352 converts the attenuation factors computed in step 510 into an intermediate format in step 520. In the preferred embodiment, this intermediate format includes two intermediate values: 1) a scaled attenuation factor within the numeric range for color values (0.0 to 1.0), and 2) a shift count which represents the number of bits the original attenuation factor was shifted in order to generate the scaled attenuation factor.

For example, consider an example where the attenuation factor calculated by F-core block 352 is 7.2. This quantity may also be represented as 0.9×8, which is the same as $0.9 \times 2^3$. An attenuation factor of 7.2 may thus be represented as 0.9 with a shift count of 3 (7.2 is 0.9 shifted three bits to the left, or, alternately, 0.9 is 7.2 shifted three bits to the right). In the preferred embodiment, the shift count may be up to three bits long, such that the maximum shift count is 7, which is equal to a divide by 128. Shift counts which are calculated to be above the maximum value are clamped at this value in one embodiment.

In one embodiment, the shift count may be calculated from subtracting a constant value from the exponent of the floating point value of the attenuation value. For example, since the exponent of 0.5 is 126 (7E in hexadecimal) in IEEE representation, 126 may be subtracted from the exponent of a given attenuation factor to generate the shift count. The scaled attenuation factor may then be produced by shifting the original value by the number of bits indicated by the shift count. Using this convention, the value 1.0 is represented by 0.5 with a shift count of 1. Other constants may be used depending on the range the desired scaled value (a subtraction constant of 126 will produce values greater than or equal to 0.5 and less than 1.0, while a subtraction constant of 125 will produced values greater than or equal to 0.25 and less than 0.5).

In alternate embodiment, the scaled attenuation factor may be obtained by repeatedly performing an operation on the original attenuation value until it is less than some desired value (e.g., 1.0, 0.5, etc.). In one embodiment, this operation is a multiplication of the attenuation factor by 0.5 (which is equivalent to a divide by 2.0). The shift count is then given by the number of operations performed to reach the desired range. In either case, the intermediate representation includes a scaled value which may be operated on by fixed point lighting core 354 and a shift count which is indicative of the amount of scaling performed.

In step 530, the intermediate representation of the attenuation factors corresponding to the given light source and the given triangle primitive are transferred to L-core block 354 via FLL FIFO 378. The triangle primitive and corresponding light source attributes have been previously transferred to L-core block 354. (The position information for the primitive is transferred through FL buffer 374, while the light source data is stored to LL register file 410 and LT register 440 under control of block load/store control unit 352 within F-core 352). As described above, one scaled attenuation factor and one shift count are transferred for each vertex of a given triangle for a given light source. This transfer of the intermediate representation of the attenuation factors occurs from the FA-bus within F-core 352 to FIFO 378. In the preferred embodiment, the scaled attenuation factor for each vertex of a triangle is written into a FIFO 378 entry three times, such that the 48-bit entry for each scaled attenuation factor contains 3 16-bit copies of the same value. In this manner, L-core 354 may quickly perform the lighting calculations for the red, blue, and green color components of the vertex concurrently. For each light source, FLL buffer 378 includes 8 48-bit words in the preferred embodiment. As described above, three of these words are dedicated to the scaled attenuation factors, while a fourth word contains the shift count values for the triangle vertices. An additional three of these 48-bit words include xyz light directions of the light source for each vertex of the triangle, while the last word contains an ambient light value. In other embodiments, different parameters may be transferred to L-core 354.

In one embodiment, LL register file 410 stores information for up to 32 lights, each of which may be either local or infinite. The attenuation calculations of steps 510 and 520 are performed sequentially for each local light source. The results are then placed into FLL FIFO 378 to be transferred to L-core 354 as part of step 530. If FIFO 378 is full (at least three 16-bit entries are not available), F-core 352 stalls until L-core 354 takes an entry out of buffer 378.

When scaled attenuation factors and shift counts are placed into FLL buffer 378, L-core 354 is notified that local light data is present. L-core 354 then performs a "transfer shift" command in the preferred embodiment, causing the shift values to be written to special shift registers in special function block 465. The scaled attenuation factors are placed on LB-bus within L-core 354 in response to any "multiply_add" instruction performed by L-core 354.

In step 540, L-core 354 continues the local lighting computations. In the preferred embodiment, this is performed by a "mult48_shift_clamp" instruction. For the first vertex of the triangle primitive, the 16-bit red, green, and blue color components are transferred from LI buffer 376 to LA-bus. These color components may correspond to one of various lighting types (ambient, diffuse, specular, etc.). The scaled attenuation factor for the first vertex is present on LB-bus (three times, having been replicated by Fcore 352 in FLL 378 as described above). The "mult48_shift_clamp" instruction causes multiply accumulate unit 450 in L-core block 354 to multiply the attenuation factor by the color contribution for the current light source, thereby generating preliminary color values for the light source.

In step 540B (still as part of the "mult48_shift_clamp" instruction), the preliminary color values are shifted by the appropriate shift count (the one for the current vertex) stored in special function block 465. In step 540C, it is determined whether the result of the shift count has caused an overflow of the predetermined numeric range for color values (up to 1.0 in the preferred embodiment). If an overflow is detected in one or more of the output color values, the color values are clamped to the maximum representable color value in step 540D. If, however, an overflow is not detected, the value is not clamped. Once the color contributions for all light sources are summed, the final color value (which may be clamped or not clamped) is written on LD-bus to LS buffer 386 for conveyance to S-core block 356. It is noted that an overflow corresponding to any one of a plurality of local light sources illuminating a particular vertex causes the final color value (which considers all light sources) to be clamped.

It is further noted that a "mult48_shift_clamp" instruction is performed for each color component (e.g., ambient color) of a given light source. The results of each instruction are summed to provide a total color contribution for the given light source. Any one of the various color components may cause an overflow. It is additionally noted that the steps described above are repeated for each vertex of the primitive.

In step 550, the color values as computed by the "mult48_shift_clamp" instruction are used in subsequent operations in the graphics pipeline.

Note that while an attenuation factor itself may overflow the fixed point range of L-core 354, the result of the multiply (after shifting in step 540B), may not necessarily be an overflow itself. Without method 500, then, color values would always be clamped in response to an attenuation factor overflow. By using method 500, however, an intermediate representation of the attenuation factor (which is within a range representable by L-core 354) is maintained during an intermediate step of the lighting calculations. This allows lighting calculations involving these attenuation factors to proceed even though a fixed point format is used. The fixed point L-core 354 is significantly faster and smaller than a similar floating point lighting unit, which increases performance and reduces cost.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for performing graphics calculations using operands within a given numeric range, said method comprising:
    computing a value of a first parameter usable for performing said graphics calculations;
    representing said value of said first parameter in an intermediate format, wherein said intermediate format includes a first intermediate value within said given numeric range, and a second intermediate value usable to convert said first intermediate value back to said value of said first parameter;
    performing said graphics calculations using said first intermediate value, thereby generating an intermediate result value, wherein said performing includes converting said intermediate result value to a final result value using said second intermediate value.

2. The method of claim 1, wherein said graphics calculations are lighting operations.

3. The method of claim 2, wherein said value of said first parameter is an attenuation factor corresponding to a first local light source, wherein said attenuation factor is used in performed said lighting operations.

4. The method of claim 1, further comprising shifting said value of said first parameter by a number of bits equal to said second intermediate value, thereby producing said first intermediate value.

5. The method of claim 4, wherein said second intermediate value represents a shift count value, and wherein said shifting effectuates a divide operation, and wherein said shift count value has a maximum value.

6. The method of claim 5, further comprising clamping said shift count value to said maximum value in response to said shift count value exceeding said maximum value.

7. The method of claim 1, wherein said computing said value of said first parameter is performed using a floating point format.

8. The method of claim 7, wherein said performing said graphics calculations is performed using a fixed point format.

9. A method for performing graphics calculations using operands within a given numeric range, said method comprising:
    computing a value of a first parameter usable for performing said graphics calculations;
    representing said value of said first parameter in an intermediate format, wherein said intermediate format includes a first intermediate value within said given numeric range, and a second intermediate value usable to convert said first intermediate value back to said value of said first parameter;
    performing said graphics calculations using said first intermediate value, thereby generating an intermediate result value, wherein said performing includes converting said intermediate result value to a final result value using said second intermediate value, wherein said converting said intermediate result value to said first color value includes clamping said final color value to a predetermined maximum color value in response to said final color value exceeding said predetermined maximum color value.

10. The method of claim 1, wherein said representing said value of said first parameter in said intermediate format comprises subtracting a constant from an exponent portion of said value of said first parameter, thereby producing said second intermediate value.

11. The method of claim 1, wherein said representing said value of said first parameter in said intermediate format comprises repeatedly multiplying a current value of said first parameter by a given value until said current value of said first parameter is within said given numeric range, wherein said second intermediate value is equal to a number of times said value of said first parameter is multiplied.

12. A method for performing graphics calculations using operands within a given numeric range, said method comprising:
    computing a value of a first parameter usable for performing said graphics calculations;
    representing said value of said first parameter in an intermediate format, wherein said intermediate format includes a first intermediate value within said given numeric range, and a second intermediate value usable to convert said first intermediate value back to said value of said first parameter, wherein said representing said value of said first parameter in said intermediate format comprises repeatedly dividing a current value of said first parameter by a given value until said current value of said first parameter is within said given numeric range, wherein said second intermediate value is equal to a number of times said value of said first parameter is divided;
    performing said graphics calculations using said first intermediate value, thereby generating an intermediate result value, wherein said performing includes converting said intermediate result value to a final result value using said second intermediate value.

13. The method of claim 3, wherein said lighting calculations include effects of said attenuation factor corresponding to said first local light source.

14. The method of claim 2, further comprising:
    computing a value of a second parameter usable for performing additional lighting calculations, wherein said value of said second parameter is an attenuation factor corresponding to a second local light source;

representing said value of said second parameter in said intermediate format, wherein said intermediate format for said value of said second parameter includes a third intermediate value within said given numeric range, and a fourth intermediate value usable to convert said third intermediate value back to said value of said second parameter;

performing said additional lighting calculations using said intermediate format of said value of said second parameter, wherein said performing said additional lighting calculations generates an second intermediate result value, and wherein said performing said additional lighting calculations includes converting said second intermediate color value to a second final result value using said fourth intermediate value.

15. The method of claim 14, further comprising adding said second final result value to said final result value, thereby producing a total result value.

16. The method of claim 15, further comprising clamping said total result value to a predetermined maximum result value in response to said total result value exceeding said predetermined maximum result value.

17. A method for performing lighting calculations using fixed point operands within a given numeric range, said method comprising:

computing a value of a first parameter usable for performing said lighting calculations, wherein said value of said first parameter is represented in a floating point format;

representing said value of said first parameter as a first intermediate value and a second intermediate value, wherein said first intermediate value is a fixed point number within said given numeric range, and wherein said second intermediate value is a shift count usable to convert said first intermediate value back to said value of said first parameter;

performing said lighting calculations using said first intermediate value, thereby generating an intermediate color value, wherein said performing said lighting calculations includes converting said intermediate color value to a final color value using said shift count.

18. The method of claim 17, further comprising transferring said first intermediate value and said second intermediate value to a lighting unit for said performing said lighting calculations.

19. The method of claim 17, wherein said value of said first parameter is an attenuation factor corresponding to a first local light source.

20. The method of claim 17, further comprising shifting said value of said first parameter by a number of bits equal to said shift count, thereby producing said first intermediate value.

21. The method of claim 17, wherein said shift count value has a maximum value.

22. The method of claim 21, further comprising clamping said shift count value to said maximum value in response to said shift count value exceeding said maximum value.

23. A method for performing lighting calculations using fixed point operands within a given numeric range, said method comprising:

computing a value of a first parameter usable for performing said lighting calculations, wherein said value of said first parameter is represented in a floating point format;

representing said value of said first parameter as a first intermediate value and a second intermediate value, wherein said first intermediate value is a fixed point number within said given numeric range, and wherein said second intermediate value is a shift count usable to convert said first intermediate value back to said value of said first parameter;

performing said lighting calculations using said first intermediate value, thereby generating an intermediate color value, wherein said performing said lighting calculations includes converting said inter mediate color value to a final color value using said shift count, wherein said converting said intermediate color value to said final color value includes clamping said final color value to a predetermined maximum color value in response to said final color value exceeding said predetermined maximum color value.

24. The method of claim 17, wherein said representing said value of said first parameter in said intermediate format comprises subtracting a constant from an exponent portion of said value of said first parameter, thereby producing said shift count.

25. The method of claim 17, wherein said representing said value of said first parameter in said intermediate format comprises repeatedly multiplying a current value of said first parameter by a given value until said current value of said first parameter is within said given numeric range, wherein said second intermediate value is equal to a number of times said value of said first parameter is multiplied.

26. A method for performing lighting calculations using fixed point operands within a given numeric range, said method comprising:

computing a value of a first parameter usable for performing said lighting calculations, wherein said value of said first parameter is represented in a floating point format;

representing said value of said first parameter as a first intermediate value and a second intermediate value, wherein said first intermediate value is a fixed point number within said given numeric range, and wherein said second intermediate value is a shift count usable to convert said first intermediate value back to said value of said first parameter, wherein said representing said value of said first parameter in said intermediate format comprises repeatedly dividing a current value of said first parameter by a given value until said current value of said first parameter is within said given numeric range, wherein said second intermediate value is equal to a number of times said value of said first parameter is divided;

performing said lighting calculations using said first intermediate value, thereby generating an intermediate color value, wherein said performing said lighting calculations includes converting said intermediate color value to a final color value using said shift count.

27. A 3-D graphics accelerator for performing a given graphics operation using operands within a given numeric range, comprising:

a first computational unit, wherein said first computational unit is configured to compute a value of a first parameter usable for performing said given graphics operation, and wherein said first computational unit is configured to represent said value of said first parameter in an intermediate format, wherein said intermediate format includes a first intermediate value within said given numeric range and a second intermediate value usable to convert said first intermediate value back to said value of said first parameter, and wherein said first computational unit is configured to convey said intermediate format of said value of said first parameter;

a second computational unit coupled to said first computational unit, wherein said second computational unit is configured to receive said intermediate format of said value of said first parameter, and wherein said second computational unit is configured to perform said given graphics operation using said first intermediate value, thereby generating an intermediate result value, and wherein said second computational unit is configured to convert said intermediate result value to a final result value using said second intermediate value.

28. The 3-D graphics accelerator of claim 27, wherein said given graphics operation is a lighting operation.

29. The 3-D graphics accelerator of claim 28, wherein said value of said first parameter is an attenuation factor corresponding to a first local light source, wherein said attenuation factor is used in performed said lighting operation.

30. The 3-D graphics accelerator of claim 27, wherein said first computational unit is further configured to shift said value of said first parameter by a number of bits equal to said second intermediate value, thereby producing said first intermediate value.

31. The 3-D graphics accelerator of claim 30, wherein said second intermediate value represents a shift count value, and wherein said shift count value has a maximum value.

32. The 3-D graphics accelerator of claim 31, wherein said first computational unit is further configured to clamp said shift count value to said maximum value in response to said shift count value exceeding said maximum value.

33. The 3-D graphics accelerator of claim 27, wherein said value of said first parameter is computed using a floating point format.

34. The 3-D graphics accelerator of claim 33, wherein said given graphics operation is performed using a fixed point format.

35. The 3-D graphics accelerator of claim 27, wherein said second computational unit is further configured to clamp said final color value to a predetermined maximum color value in response to said final color value exceeding said predetermined maximum color value.

36. The 3-D graphics accelerator of claim 27, wherein said first computational unit is configured to generate said second intermediate value by subtracting a constant from an exponent portion of said value of said first parameter.

37. The 3-D graphics accelerator of claim 27, wherein said first computational unit is configured to generate said second intermediate value by repeatedly multiplying a current value of said first parameter by a given value until said current value of said first parameter is within said given numeric range, wherein said second intermediate value is equal to a number of times said value of said first parameter is multiplied.

38. A 3-D graphics accelerator for performing a given graphics operation using operands within a given numeric range, comprising:

a first computational unit, wherein said first computational unit is configured to compute a value of a first parameter usable for performing said given graphics operation, and wherein said first computational unit is configured to represent said value of said first parameter in an intermediate format, wherein said intermediate format includes a first intermediate value within said given numeric range and a second intermediate value usable to convert said first intermediate value back to said value of said first parameter, and wherein said first computational unit is configured to convey said intermediate format of said value of said first parameter, wherein said first computational unit is configured to generate said second intermediate value by repeatedly dividing a current value of said first parameter by a given value until said current value of said first parameter is within said given numeric range, wherein said second intermediate value is equal to a number of times said value of said first parameter is divided;

a second computational unit coupled to said first computational unit, wherein said second computational unit is configured to receive said intermediate format of said value of said first parameter, and wherein said second computational unit is configured to perform said given graphics operation using said first intermediate value, thereby generating an intermediate result value, and wherein said second computational unit is configured to convert said intermediate result value to a final result value using said second intermediate value.

39. The 3-D graphics accelerator of claim 29, wherein said lighting operation includes effects of said attenuation factor corresponding to said first local light source.

40. The 3-D graphics accelerator of claim 28, wherein said 3-D graphics accelerator is additionally configured to perform lighting operations according to a second local light source having a corresponding second attenuation factor, thereby producing a second final result value.

41. The 3-D graphics accelerator of claim 40, wherein said 3-D graphics accelerator is further configured to add said second final result value to said final result value, thereby producing a total result value.

42. The 3-D graphics accelerator of claim 41, wherein said lighting unit is further configured to clamp said total result value to a predetermined maximum result value in response to said total result value exceeding said predetermined maximum result value.

43. A 3-D graphics accelerator for performing lighting operations using operands within a given numeric range, comprising:

a first computational unit which is configured to compute a value of said of a first parameter usable for performing said lighting operation, wherein said first computational unit is configured to represent said value of said first parameter in an intermediate format, and wherein said intermediate format includes a first intermediate value within said given numeric range and a second intermediate value usable to convert said first intermediate value back to said value of said first parameter, and wherein said first computational unit is configured to convey said intermediate format of said value of said first parameter;

a lighting unit coupled to said first computational unit, wherein said lighting unit is configured to receive said intermediate format of said value of said first parameter, and wherein said lighting unit is configured to perform said lighting operations using said first intermediate value, thereby generating an intermediate result value, and wherein said lighting unit is configured to convert said intermediate result value to a final result value using said second intermediate value;

and wherein said value of said first parameter is represented in a floating point format, and wherein said lighting operations are performed using fixed-point operands which are within said given numeric range.

44. The 3-D graphics accelerator of claim 43, wherein said value of said first parameter is an attenuation factor corresponding to a first local light source.

45. The 3-D graphics accelerator of claim 43, wherein said first computational unit is further configured to shift said value of said first parameter by a number of bits equal to said second intermediate value, thereby producing said first intermediate value.

46. A 3-D graphics accelerator for performing lighting operations using operands within a given numeric range, comprising:

a first computational unit which is configured to compute a value of said of a first parameter usable for performing said lighting operation, wherein said first computational unit is configured to represent said value of said first parameter in an intermediate format, and wherein said intermediate format includes a first intermediate value within said given numeric range and a second intermediate value usable to convert said first intermediate value back to said value of said first parameter, and wherein said first computational unit is configured to convey said intermediate format of said value of said first parameter, wherein said first computational unit is further configured to shift said value of said first parameter by a number of bits equal to said second intermediate value, thereby producing said first intermediate value, wherein said second intermediate value represents a shift count value, and wherein said shifting effectuates a divide operation, and wherein said shift count value has a maximum value;

a lighting unit coupled to said first computational unit, wherein said lighting unit is configured to receive said intermediate format of said value of said first parameter, and wherein said lighting unit is configured to perform said lighting operations using said first intermediate value, thereby generating an intermediate result value, and wherein said lighting unit is configured to convert said intermediate result value to a final result value using said second intermediate value;

and wherein said value of said first parameter is represented in a floating point format, and wherein said lighting operations are performed using fixed-point operands which are within said given numeric range.

47. The 3-D graphics accelerator of claim 46, wherein said first computational unit is further configured to clamp said shift count value to said maximum value in response to said shift count value exceeding said maximum value.

48. The 3-D graphics accelerator of claim 43, wherein said lighting unit is configured to clamp said final result value to a predetermined maximum result value in response to said final result value exceeding said predetermined maximum result value.

49. The 3-D graphics accelerator of claim 43, wherein said first computational unit is configured to generate said second intermediate value by subtracting a constant from an exponent portion of said value of said first parameter.

50. The 3-D graphics accelerator of claim 43, wherein said first computational unit is configured to generate said second intermediate value by repeatedly multiplying a current value of said first parameter by a given value until said current value of said first parameter is within said given numeric range, wherein said second intermediate value is equal to a number of times said value of said first parameter is multiplied.

51. The 3-D graphics accelerator of claim 43, wherein said first computational unit is configured to generate said second intermediate value by repeatedly dividing a current value of said first parameter by a given value until said current value of said first parameter is within said given numeric range, wherein said second intermediate value is equal to a number of times said value of said first parameter is divided.

* * * * *